United States Patent
Chen et al.

(10) Patent No.: US 9,122,331 B2
(45) Date of Patent: Sep. 1, 2015

(54) FRAME WITH SENSING FUNCTION AND TOUCH CONTROL METHOD

(71) Applicant: WISTRON CORP., New Taipei (TW)

(72) Inventors: Yu-Yen Chen, New Taipei (TW); Shang-Chin Su, New Taipei (TW); Hsun-Hao Chang, New Taipei (TW); Chia-Ta Hsieh, New Taipei (TW)

(73) Assignee: WISTRON CORP., New Taipei (TW)

( * ) Notice: Subject to any disclaimer, the term of this patent is extended or adjusted under 35 U.S.C. 154(b) by 429 days.

(21) Appl. No.: 13/693,004

(22) Filed: Dec. 3, 2012

(65) Prior Publication Data

US 2014/0015792 A1 Jan. 16, 2014

(30) Foreign Application Priority Data

Jul. 11, 2012 (TW) .............................. 101124933 A (51) Int. Cl.
  *G06F 3/041* (2006.01)
  *G06F 3/044* (2006.01)
  *G06F 3/042* (2006.01)
  *G06F 3/046* (2006.01)

(52) U.S. Cl.
  CPC ................ *G06F 3/041* (2013.01); *G06F 3/044* (2013.01); *G06F 3/046* (2013.01); *G06F 3/0418* (2013.01); *G06F 3/0421* (2013.01)

(58) Field of Classification Search
  USPC ........................................................ 345/173
  See application file for complete search history.

(56) References Cited

U.S. PATENT DOCUMENTS

| | | | | |
|---|---|---|---|---|
| 5,115,107 A | * | 5/1992 | Crooks et al. | 345/178 |
| 5,777,898 A | * | 7/1998 | Teterwak | 702/95 |
| 7,576,733 B2 | * | 8/2009 | Tremaine et al. | 345/178 |
| 2005/0073506 A1 | * | 4/2005 | Durso | 345/173 |
| 2006/0066580 A1 | * | 3/2006 | Hsu | 345/173 |
| 2010/0085329 A1 | | 4/2010 | Tseng et al. | |

FOREIGN PATENT DOCUMENTS

TW M375933 U1 3/2010

* cited by examiner

*Primary Examiner* — Robin Mishler
(74) *Attorney, Agent, or Firm* — CKC & Partners Co., Ltd.

(57) ABSTRACT

A frame with a sensing function includes a frame structure, a sensor and a processing unit. The processing unit is electrically connected to the sensor. The frame structure is configured for hanging on a display unit. The sensor senses a touched position set of the display unit for position setting. The processing unit includes a parameter calculating module and a parameter providing module. The parameter calculating module calculates a position transformation parameter between the hanged frame structure and the display unit according to the touched position set. The parameter providing module provides the position transformation parameter, such that a display content displayed on the display unit is controlled according to at least one touched position for operation sensed by the sensor and the position transformation parameter.

16 Claims, 5 Drawing Sheets

FRAME WITH SENSING FUNCTION AND TOUCH CONTROL METHOD

RELATED APPLICATIONS

This application claims priority to Taiwanese Application Serial Number 101124933, filed Jul. 11, 2012, which is herein incorporated by reference.

BACKGROUND

1. Technical Field

The present invention relates to a frame with a sensing function and a related touch control method. More particularly, the present invention relates to a frame which provides a touch control function after being hanged on a display unit and a related touch control method.

2. Description of Related Art

With the advent of the digital era, electrical devices are becoming essential media for modern people to acquire information, knowledge or to communicate with each other. Conventionally, electrical devices are mostly equipped with a display unit for displaying digital information.

Subsequently, a touch panel is developed for receiving input signals generated with fingers or stylus tips. When a user touches graphical icons displayed on the touch panel utilizing his/her finger or a stylus tip, the touch panel correspondingly executes touch control instructions. Recently, touch panels are more and more popular, and, have been becoming a must-have component in the most of new generation electrical devices.

However, the display units unequipped with touch panels can only be operated through other input units, such as keyboards, mice, various function keys and so on, but are unable to provide the touch control instructions.

SUMMARY

According to one embodiment of this invention, a frame with a sensing function is provided to be hanged on a display unit and then provide a touch control function to the display unit with a sensor disposed on the frame. The frame with a sensing function includes a frame structure, a sensor and a processing unit. The processing unit is electrically connected to the sensor. The frame structure is configured for being hanged on a display unit. The sensor senses a touched position set of the display unit for position setting. The processing unit includes a parameter calculating module and a parameter providing module. The parameter calculating module calculates a position transformation parameter between the hanged frame structure and the display unit according to the touched position set. The parameter providing module provides the position transformation parameter. Hence, a display content displayed on the display unit is controlled according to at least one touched position for operation sensed by the sensor and the position transformation parameter.

According to another embodiment of this invention, a touch control method is provided to hang a frame on a display unit and then provide a touch control function to the display unit with a sensor disposed on the frame. The touch control method includes the following step:

(a) A touched position set of a display unit for position setting is sensed by a sensor. Wherein, the sensor is disposed on a frame and the frame is hanged on the display unit.

(b) A position transformation parameter between the hanged frame and the display unit is calculated according to the touched position set.

(c) At least one touched position for operation sensed by the sensor is transformed into a corresponding position on a display content displayed on the display unit according to the position transformation parameter.

(d) The display content displayed on the display unit is controlled according to the corresponding position.

The present invention can achieve many advantages as follows. Even if the display unit is not a touch screen, a touch control function can be provided by hanging the frame with a sensing function to the display unit.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
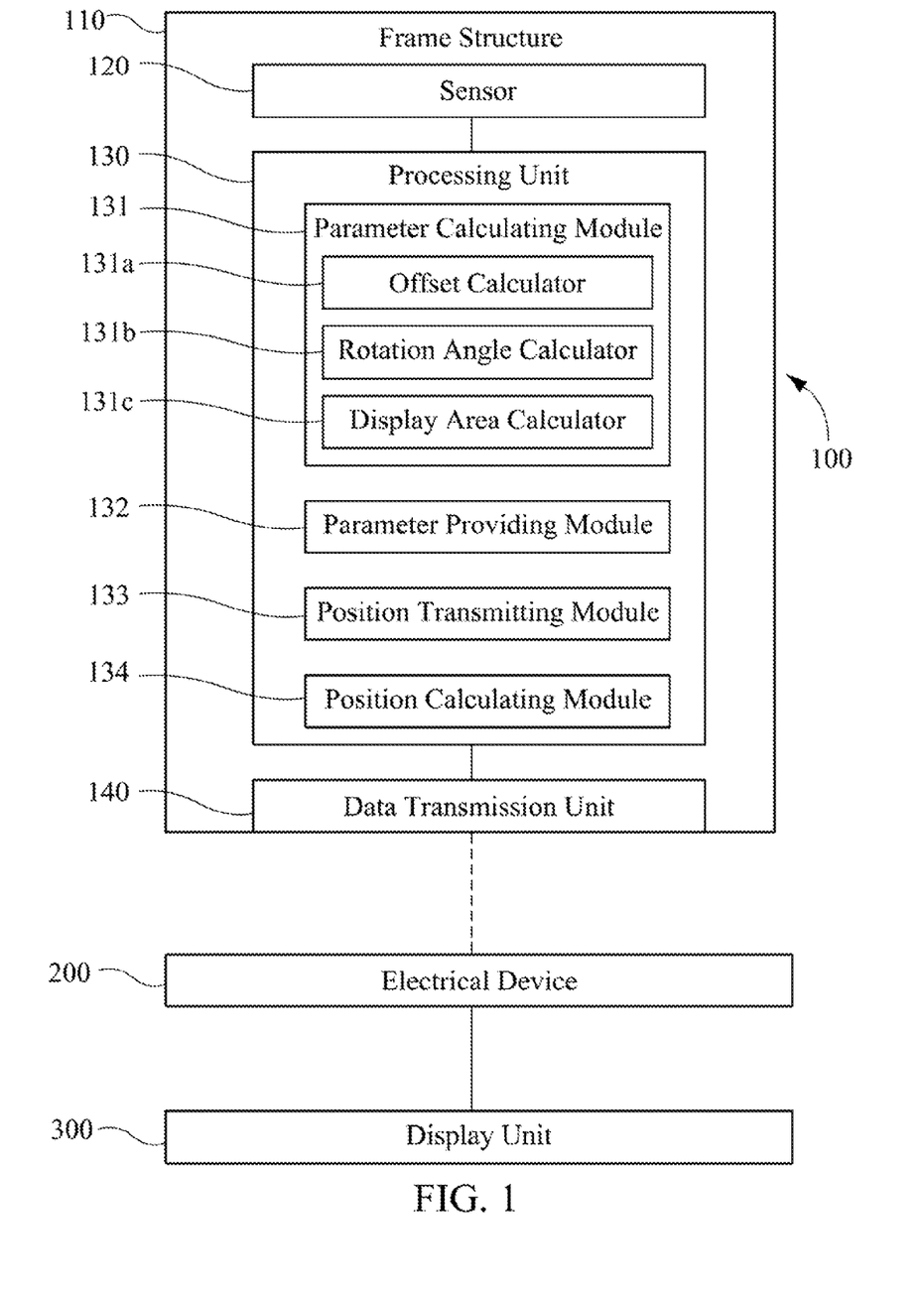
FIG. 1 illustrates a block diagram of a frame with a sensing function according to an embodiment of this invention.
Figure 2:
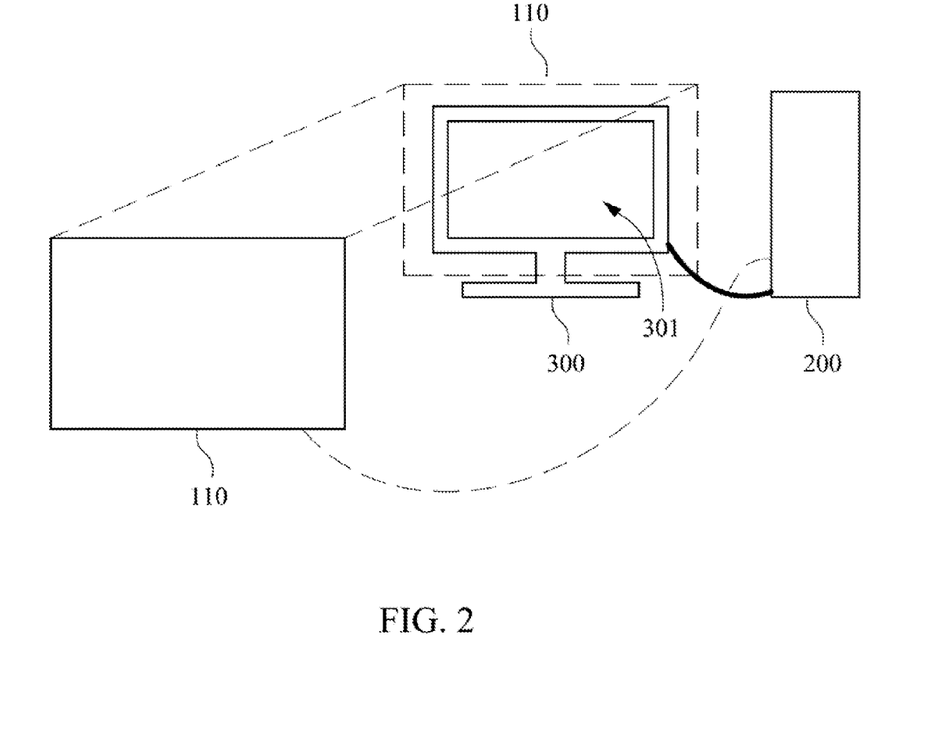
FIG. 2 illustrates a scenario to use the frame with a sensing function.

FIG. 1 illustrates a block diagram of a frame with a sensing function according to an embodiment of this invention. FIG. 2 illustrates a scenario to use the frame with a sensing function. The frame with a sensing function is hanged on a display unit and then provides a touch control function to the display unit with a sensor disposed on the frame.

Refer to FIG. 1 and FIG. 2. The frame 100 with a sensing function includes a frame structure 110, a sensor 120 and a processing unit 130. The frame structure 110 is configured to be hanged on a display unit 300. An electrical device 200 connects to the display unit 300 to output information to the display unit 300 for display. In one embodiment, the sensor 120 is a capacitive touch panel, an inductive touch panel, or any other type of touch panel. In another embodiment of this invention, the sensor 120 is an optical sensing unit. The optical sensing unit may be a reflective type photo interrupter or a transmission type photo interrupter. The processing unit may be a central processing unit (CPU), a control unit or any other type of processing unit.

The sensor 120 is electrically connected to the processing unit 130. The sensor senses a touched position set of the display unit 300 for position setting. Wherein, the touched position set may include at least one position touched on the display unit 300, which is sensed by the sensor 120.

The processing unit 130 includes a parameter calculating module 131 and a parameter providing module 132. The parameter calculating module 131 calculates a position transformation parameter between the hanged frame structure 110 and the display unit 300 according to the touched position set received from the sensor 120. The parameter providing module 132 provides the position transformation parameter. Hence, a display content displayed on the display unit 300 is controlled according to at least one touched position for operation sensed by the sensor 120 and the position transformation parameter. Therefore, even if the display unit 300 is not a touch screen, a touch control function can be provided by hanging the frame 100 with a sensing function to the display unit 300.

Figure 3:
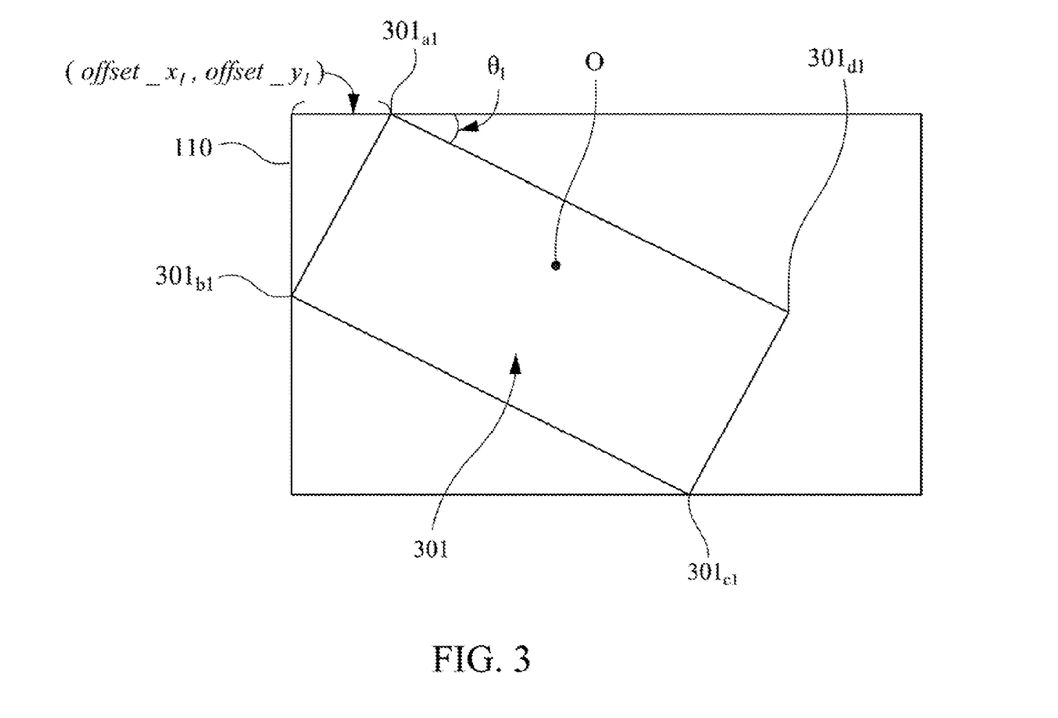
FIG. 3 is a diagram showing an embodiment of this invention.

In detail, refer to FIG. 3, which is a diagram showing an embodiment of this invention. When the frame structure 110 is hanged on the display unit 300, a user can touch three of the four vertices $301_{a1}$, $301_{b1}$, $301_{c1}$, $301_{d1}$ of the display area 301 of the display unit 300, such that the sensor 120 may sense three vertex touched positions corresponding to such touched. In this example, the user touches the vertices $301_{a1}$, $301_{b1}$, $301_{c1}$ of the display area 301 of the display unit 300 for the sensor 120 to sense the corresponding vertex touched positions. The processing unit 130 may calculate the forth vertex position if the forth vertex $301_{d1}$ of the display area 301 of the display unit 300 is touched. Subsequently, a rotation angle calculator 131*b* of the parameter calculating module 131 may calculate a rotation angle between the hanged frame structure 110 and the display area 301 of the display unit 300 according to the two vertex touched positions when the user touches the vertices $301_{a1}$, $301_{d1}$, and the rotation angle can be included in the position transformation parameter. For example, the rotation angle $\theta_1$ can be calculated utilizing formula (1) as follows:

$$\theta_1 = \tan^{-1}\left(\frac{y_{301d1} - y_{301a1}}{x_{301d1} - x_{301a1}}\right)$$

Wherein, $(x_{301a1}, y_{301a1})$ is the vertex touched position sensed by the sensor 120 when the user touches the vertices $301_{a1}$ of the display area 301, and $(a_{301d1}, y_{301d1})$ is the vertex touched position sensed by the sensor 120 when the user touches the vertices $301_{d1}$ of the display area 301.

In addition, an offset calculator 131*a* of the parameter calculating module 131 may calculate an offset between the hanged frame structure 110 and the display area 301 of the display unit 300 according to the three vertex touched positions when the user touches the vertices $301_{a1}$, $301_{b1}$, $301_{c1}$, and the offset can be included in the position transformation parameter. Subsequently, if a position O is sensed by the sensor 120 during a user's touch control operation, a position of the display area 301 corresponding to the position O can be obtained according to the rotation angle and the offset of the position transformation parameter, such that corresponding touch control operation can be performed.

For example, the offset calculator 131*a* of the parameter calculating module 131 may calculate an offset (offset_$x_1$, offset_$y_1$) between the hanged frame structure 110 and the vertices $301_{a1}$ of the display area 301 of the display unit 300 according to the vertex touched positions when the user touches the vertices $301_{a1}$, and the offset (offset_$x_1$, offset_$y_1$) can be included in the position transformation parameter. The offset (offset_$x_1$, offset_$y_1$) (can be calculated utilizing formula (2) as $$(\text{offset\_}x_1, \text{offset\_}y_1) = (\text{Origin\_}x_1 - x_{301a1}, \text{Origin\_}y_1 - y_{301a1})$$

Wherein, (Origin_$x_1$, Origin_$y_1$) is the upper left vertex of the hanged frame structure 110, and $(x_{301a1}, y_{301a1})$ is the vertex touched position when the vertices $301_{a1}$ is touched.

Accordingly, when the sensor 120 senses $(x_{O1}, y_{O1})$, which corresponds to the touched position O for touch control, the position $(x'_{O1}, y'_{O1})$ on the display area 301 corresponding to the touched position O can be calculated utilizing formula (3) as follows:

$$\begin{bmatrix} x'_{O1} \\ y'_{O1} \end{bmatrix} = \begin{bmatrix} \cos\theta_1 & -\sin\theta_1 \\ \sin\theta_1 & \cos\theta_1 \end{bmatrix} \begin{bmatrix} x_{O1} \\ y_{O1} \end{bmatrix} + \begin{bmatrix} \text{offset\_}x_1 \\ \text{offset\_}y_1 \end{bmatrix}$$

Accordingly, corresponding touch control can be performed according to the position $(x'_{O1}, y'_{O1})$ on the display area 301.

In other embodiments, the parameter calculating module 131 may calculate the position transformation parameter between the hanged frame structure 110 and the display unit 300 utilizing other positions sensed by the sensor 120 when other points on the display area 301 of the display unit 300 or utilizing other formulas, which should not be limited in this disclosure. Moreover, a display area calculator 131*c* of the parameter calculating module 131 may calculating a display area of the display unit 300 according to the three vertex touched positions, such that if a position corresponding to a touched position for touch control is out of the display area of the display unit 300 can be determined according to the display area.

In one embodiment of this invention, the frame 100 with a sensing function may further include a data transmission unit 140 electrically connected to the processing unit 130. The data transmission unit 140 may build a connection with the electrical device 200, which outputs the display content to the display unit 300, through a wired or wireless data transmission interface. Hence, in one embodiment of this invention, the parameter providing module 132 may provide the position transformation parameter to the electrical device 200 through the data transmission unit 140. Then, the electrical device 200 can drive the frame 100 with a sensing function and the display unit 300 to provide the touch control function according to the position transformation parameter. In detail, when a user does some operations, a position transmitting module 133 of the processing unit 130 transmits a touched position, which is sensed by the sensor 120 during user's operations, to the electrical device 200 through the data transmitting unit 140. Subsequently, the electrical device 200 transforms the touched position for operation into a corresponding position on the display content displayed by the display unit 300 according to the position transformation parameter, such that a corresponding touch control function may be performed. Therefore, since the position transformation is not calculated by the processing unit 130, a hardware with poor calculation ability can be taken as the processing unit 130, which can reduce hardware cost.

In another embodiment of this invention, the processing unit 130 can further include a position calculating module 134. The position calculating module 134 may transform the touched position for operation into a corresponding position on the display content of the display unit 300 according to the position transformation parameter. Subsequently, the position transmitting module 133 transmits the corresponding position to the electrical device 200. Hence, the electrical device 200 can control the display content displayed on the display unit 300 according to the corresponding position to perform a corresponding touch control function.

The parameter calculating module 131 may further include a display area calculator 131c. The display area calculator 131c calculates a display area 301 of the display unit 300 according to the touched position set. Hence, the position transmitting module 133 may further determine if the corresponding position is out of the display area 301. When the corresponding position is out of the display area 301, the position transmitting module 133 does not transmit the corresponding position. Therefore, the position out of the display area 301 may not be provided.

Figure 4:
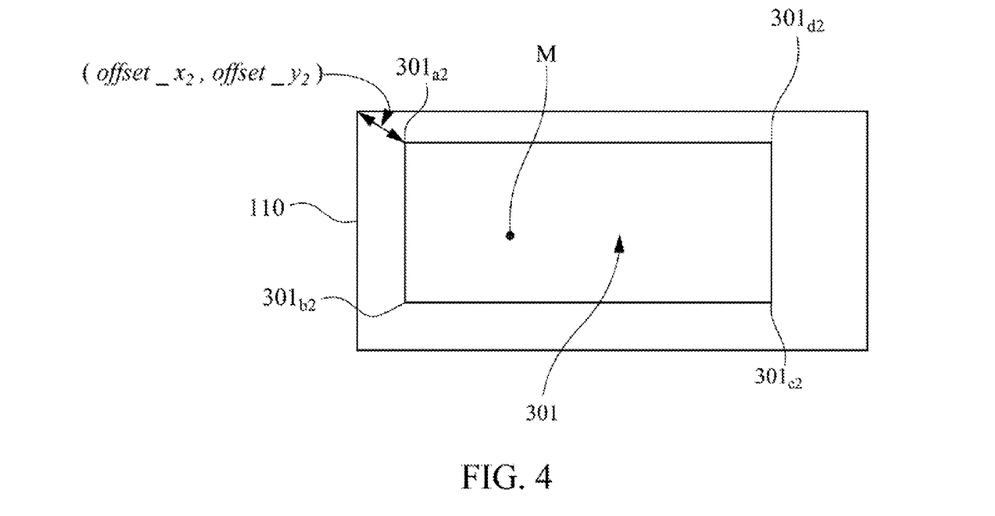
FIG. 4 illustrates a diagram showing that the frame structure 110 is hanged on the display unit 300 according to one embodiment of this invention.

In some embodiments, after the frame structure 110 is hanged on the display unit 300, the frame structure 110 is set to a position that edges of the frame structure 110 are parallel to edges of the display area 301 of the display unit 300. Wherein, the frame structure 110 may further include an align unit for aligning the frame structure 110 to be parallel to the display area 301 of the display unit 300. The align unit may be a fixing unit, a track or any other component utilized for alignment. Hence, a user can touch one of the four vertices of the display area 301 for the sensor 120 to sense a vertex touched position corresponding to such touch. The vertex touched position can be included in the touched position set for position setting. Referring to FIG. 4, which illustrates a diagram showing that the frame structure 110 is hanged on the display unit 300 according to one embodiment of this invention. In this embodiment, a user touches the vertex $301_{a2}$ of the display area 301 for the sensor 120 to sense the vertex touched position corresponding to the vertex $301_{a2}$. Subsequently, the offset calculator 131a of the parameter calculating module 131 can calculate an offset (offset_$x_2$, offset_$y_2$) between the hanged frame structure 110 and the vertex $301_{a2}$ of the display area 301 of the display unit 300 according to the vertex touched position. The offset (offset_$x_2$, offset_$y_2$) then can be taken as the position transformation parameter. Hence, when the sensor 120 senses a position ($x_{M1}$, $y_{M1}$), which is sensed when a position M is touched for operation, the position M can be then transformed into a corresponding position ($x_{M1}$−offset_$x_2$, $y_{M1}$−offset_$y_2$) on the display area 301 for touch control.

Figure 5:
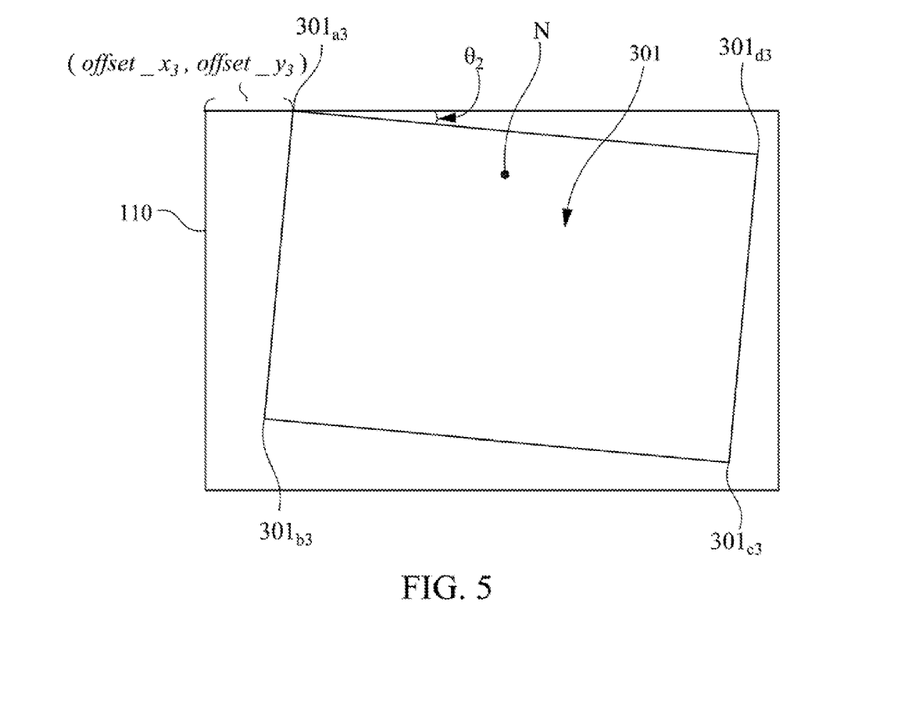
FIG. 5 illustrates a diagram showing that the frame structure 110 is hanged on the display unit 300 according to another embodiment of this invention.

In another embodiment of this invention, the aspect ratio of the frame structure 110 and that of the display area 301 of the display unit 300, which is utilized for hanging the frame structure 110, may be the same. Referring to FIG. 5, which illustrates a diagram showing that the frame structure 110 is hanged on the display unit 300 according to another embodiment of this invention. When the aspect ratio of the display area 301 and that of the frame structure 110 are the same, a user may touch at least two of the vertices $301_{a3}$, $301_{b3}$, $301_{c3}$, $301_{d3}$ of the display area 301 for the sensor 120 to sense the corresponding vertex touched positions. Such touched vertices may be those can form a diagonal line for the display area. In this embodiment, a user may touch the vertices $301_{a3}$, $301_{c3}$ of the display area 301 for the sensor 120 to sense the vertex touched position corresponding to the vertices $301_{a3}$, $301_{c3}$. Subsequently, the rotation angle calculator 131b of the parameter calculating module 131 can calculate a rotation angle $\theta_2$ between the hanged frame structure 110 and the display area 301 of the display unit 300 according to the two vertex touched positions corresponding to the two vertices $301_{a3}$, $301_{c3}$ and the aspect ratio of the frame structure 110. The rotation angle $\theta_2$ then can be included in the position transformation parameter.

For example, according to the two vertex touched positions corresponding to the two vertices $301_{a3}$, $301_{c3}$ and the aspect ratio of the frame structure 110, the rotation angle calculator 131b can calculate an angle between the diagonal line of the display area 301 formed by the vertices $301_{a3}$, $301_{c3}$ and the diagonal line of the frame structure 110 for calculating the rotation angle $\theta_2$. In addition, the offset calculator 131a of the parameter calculating module 131 can calculate an offset (offset_$x_3$, offset_$y_3$) between the hanged frame structure 110 and the display area 301 of the display unit 300 according to the two vertex touched positions corresponding to the two vertices $301_{a3}$, $301_{c3}$ and the aspect ratio of the frame structure 110. Hence, when the sensor 120 senses a position ($x_{N1}$, $y_{N1}$), which is sensed when a position N is touched for operation, the position N can be then transformed into a corresponding position ($x'_{N1}$, $y'_{N1}$) on the display area 301 for touch control utilizing the above-mentioned formula (3).

Figure 6:
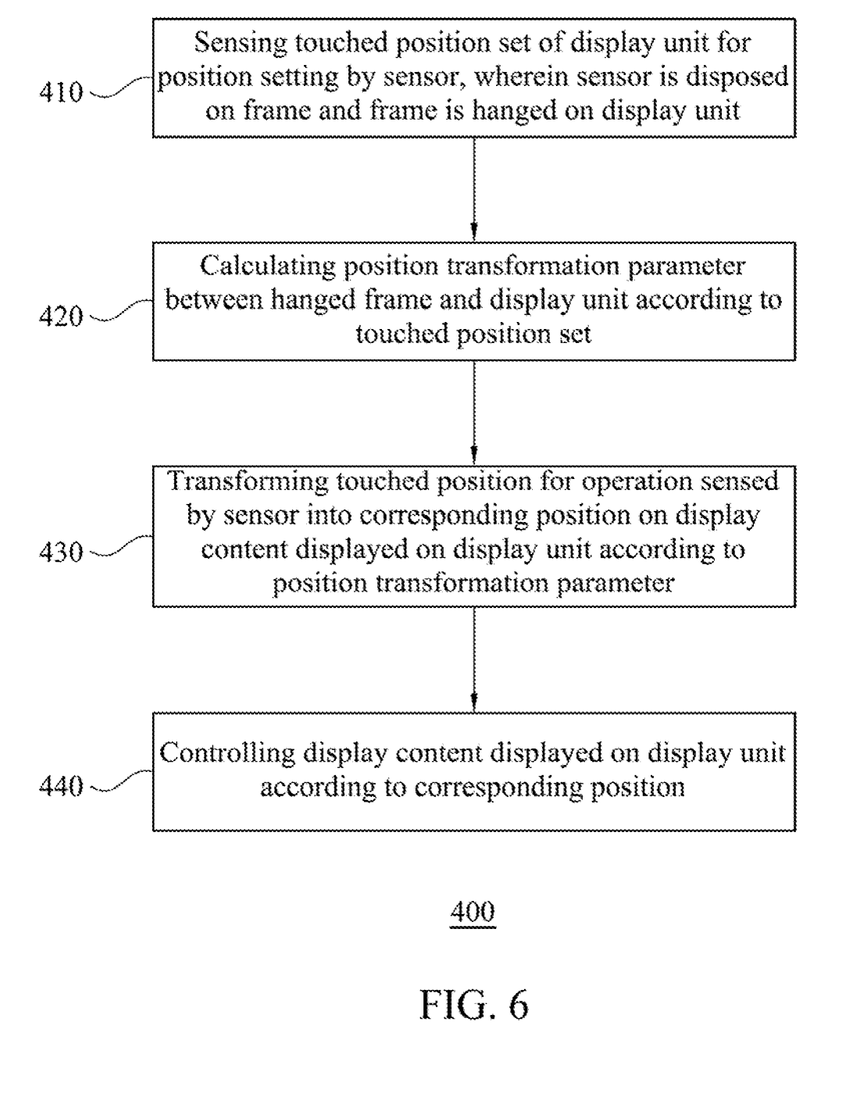
FIG. 6 is a flow diagram of a touch control method according to one embodiment of this invention

Referring to FIG. 6, a flow diagram will be described that illustrates a touch control method according to one embodiment of this invention. In the touch control method, a frame hanged on a display unit can provide a touch control function to the display unit with a sensor disposed on the frame. The touch control method may take the form of a computer program product stored on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM) dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

The touch control method 400 includes the following steps:

At step 410, a touched position set of a display unit for position setting is sensed by a sensor. Wherein, the sensor is disposed on a frame and the frame is hanged on the display unit. In one embodiment, the sensor may be a capacitive touch unit, an inductive touch panel or any other type of touch panel encircled by the frame. In another embodiment of this invention, the sensor may be an optical sensing unit disposed on the frame, such as a reflective type photo interrupter or a transmission type photo interrupter.

At step 420, a position transformation parameter between the hanged frame and the display unit is calculated according to the touched position set. In some embodiments, step 420 may be performed by a control unit, a central processing unit or any other type of processing unit disposed on the frame. In some other embodiments, step 420 may be performed by an electrical device, which output a display content to the display unit.

At step 430, at least one touched position, which is sensed by the sensor during user's touch control operation, is transformed into a corresponding position on a display content displayed on the display unit according to the position transformation parameter.

Hence, at step 440, the display content displayed on the display unit is controlled according to the corresponding position. Therefore, even if the display unit is not a touch screen, a touch control function can be provided by hanging the frame with the sensor to the display unit.

In some embodiments of this invention, the touch control method 400 may further include the following step: a display area of the display unit is calculated according to the touched position set. If the corresponding position calculated at step 430 is out of the display area is determined. When the corresponding position is out of the display area, it is determined that the corresponding position is incorrect. In some embodiments, when the corresponding position is determined incorrect, step 440 is not performed so as to avoid providing incorrect touch control functions.

Moreover, a display area of the display unit may include four vertices. Hence, in one embodiment of this invention, the touched position set for position setting includes a vertex touched position, which is sensed when a user touches one of the four vertices of the display area. In one embodiment of step 420, when the hanged frame is parallel to the display area of the display unit, an offset between the hanged frame and the display area of the display unit is calculated according to the vertex touched position. The offset is then taken as the position transformation parameter. Subsequently, in one embodiment of step 430, at least one touched position, which is sensed by the sensor during user's touch control operation, can be transformed into a corresponding position on a display content according to the offset of the position transformation parameter, such that a corresponding touch control function can be provided.

In another embodiment of this invention, the touched position set for position setting includes two vertex touched positions, which are sensed when a user touches two diagonal vertices of the display area. Hence, in one embodiment of step 420, when aspect ratio of the display area and that of the frame are the same, a rotation angle between the hanged frame and the display area of the display unit according to the two vertex touched positions and the aspect ratio of the frame, such that the rotation angle can be included in the position transformation parameter. For example, according to the two vertex touched positions corresponding to the two diagonal vertices and the aspect ratio of the frame, an angle between the diagonal line of the display area formed by the diagonal vertices and the diagonal line of the frame may be calculated for calculating the rotation angle. In addition, when aspect ratio of the display area and that of the frame are the same, an offset between the hanged frame and the display area of the display unit can be calculated according to the two vertex touched positions and the aspect ratio of the frame, such that the offset can be included in the position transformation parameter. Hence, in one embodiment of step 430, at least one touched position, which is sensed by the sensor during user's touch control operation, can be transformed into a corresponding position on a display content according to the rotation angle and the offset of the position transformation parameter, such that a corresponding touch control function can be provided.

In another embodiment of this invention, the touched position set for position setting includes three vertex touched positions, which is sensed when a user touches three vertices of the display area. Hence, in one embodiment of step 420, a rotation angle between the hanged frame and the display area of the display unit may be calculated according to the three vertex touched positions. Then, the rotation angle is included in the position transformation parameter. For example, according to the three vertex touched positions, positions of edges of the display area displayed on the display unit, which may be sensed by the sensor, may be calculated for calculating the rotation angle. Furthermore, an offset between the hanged frame and the display area of the display unit can be calculated according to the three vertex touched positions. The offset can be also included in the position transformation parameter. Hence, in one embodiment of step 430, at least one touched position, which is sensed by the sensor during user's touch control operation, can be transformed into a corresponding position on a display content according to the rotation angle and the offset of the position transformation parameter, such that a corresponding touch control function can be provided. In addition, the display area of the display unit can also be calculated according to the sensed three vertex touched positions for determining if the corresponding position is out of the display area of the display unit.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A frame with a sensing function comprising:
a frame structure configured to be hanged on a display unit;
a sensor for sensing a touched position set of the display unit for position setting; and
a processing unit electrically connected to the sensor, the processing unit comprising:
a parameter calculating module for calculating a position transformation parameter between the hanged frame structure and the display unit according to the touched position set; and
a parameter providing module for providing the position transformation parameter, such that a display content displayed on the display unit is controlled according to at least one touched position for operation sensed by the sensor and the position transformation parameter,
where a display area of the display unit comprises four vertices, and the touched position set for position setting comprises two vertex touched positions sensed when touching two of the four vertices of the display area,
wherein the parameter calculating module comprises:
a rotation angle calculator, calculating a rotation angle between the hanged frame structure and the display area of the display unit by:

$$\theta_1 = \tan^{-1}\left(\frac{y_{301d2} - y_{301a2}}{x_{301d2} - x_{301a2}}\right)$$

where $\theta_1$ is the rotation angle, and $(x_{301a2}, y_{301a2})$ and $(x_{301d2}, y_{301d2})$ are the two vertex touched positions, and the rotation angle is comprises in the position transformation parameter.

2. The frame with a sensing function of claim 1, further comprising a data transmission unit electrically connected to the processing unit, wherein:
the data transmission unit builds a connection with an electrical device which outputs the display content to the display unit;

the parameter providing module provides the position transformation parameter to the electrical device through the data transmission unit; and the processing unit further comprises a position transmitting module for transmitting the touched position for operation sensed by the sensor to the electrical device through the data transmitting unit, such that the electrical device transforms the touched position for operation into a corresponding position on the display content according to the position transformation parameter.

3. The frame with a sensing function of claim 1, wherein:
the frame with a sensing function further comprises a data transmission unit electrically connected to the processing unit,
wherein the data transmission unit builds a connection with an electrical device which outputs the display content to the display unit;
the processing unit further comprises:
 a position calculating module for transforming the touched position for operation into a corresponding position on the display content according to the position transformation parameter; and
 a position transmitting module for transmitting the corresponding position to the electrical device through the data transmission unit, such that the electrical device controls the display content displayed on the display unit according to the corresponding position.

4. The frame with a sensing function of claim 3, wherein the parameter calculating module comprises:
a display area calculator for calculating the display area of the display unit according to the touched position set, wherein the position transmitting module further determines if the corresponding position is out of the display area, and, when the corresponding position is out of the display area, the position transmitting module does not transmit the corresponding position.

5. The frame with a sensing function of claim 1, wherein:
the frame structure comprises an align unit for aligning the frame structure to be parallel to a display area of the display unit;
the touched position set for position setting comprises a vertex touched position sensed when touching one of the four vertices of the display area;
the parameter calculating module comprises:
 an offset calculator for calculating an offset between the hanged frame structure and the display area of the display unit according to the vertex touched position, wherein the offset is taken as the position transformation parameter.

6. The frame with a sensing function of claim 5, wherein the offset calculator calculates the offset by:

(offset_$x_1$,offset_$y_1$)=(Origin_$x_1$-$x_{301a1}$,Origin_$y_1$-$y_{301a1}$)

wherein (offset_$x_1$, offset_$y_1$) is the offset, (Origin_$x_1$, Origin_$y_1$) is a position of one of the vertices of the hanged frame structure, and ($x_{301a1}$, $y_{301a1}$) is the vertex touched position.

7. The frame with a sensing function of claim 1, wherein:
the parameter calculating module comprises:
 an offset calculator, wherein, when aspect ratio of the display area and that of the frame structure are the same, the offset calculator calculates an offset between the hanged frame structure and the display area of the display unit according to the two vertex touched positions and the aspect ratio of the frame structure, wherein the offset is comprised in the position transformation parameter.

8. The frame with a sensing function of claim 1, wherein:
the touched position set for position setting comprises three vertex touched positions sensed when touching three of the four vertices of the display area; and
the parameter calculating module comprises:
 an offset calculator for calculating an offset between the hanged frame structure and the display area of the display unit according to the three vertex touched positions, wherein the offset is comprised in the position transformation parameter; and
 a display area calculator for calculating a range of the display area of the display unit according to the three vertex touched positions.

9. The frame with a sensing function of claim 1, wherein the sensor is an optical sensing unit, a capacitive touch panel or an inductive touch panel.

10. A touch control method comprising:
(a) sensing a touched position set of a display unit for position setting by a sensor, wherein the sensor is disposed on a frame and the frame is hanged on the display unit;
(b) calculating a position transformation parameter between the hanged frame and the display unit according to the touched position set;
(c) transforming at least one touched position for operation sensed by the sensor into a corresponding position on a display content displayed on the display unit according to the position transformation parameter; and
(d) controlling the display content displayed on the display unit according to the corresponding position,
where a display area of the display unit comprises four vertices, the touched position set for position setting comprises two vertex touched positions sensed when touching two of the four vertices of the display area, and the step (b) comprises:
calculating a rotation angle between the hanged frame structure and the display area of the display unit by:

$$\theta_1 = \tan^{-1}\left(\frac{y_{301d2} - y_{301a2}}{x_{301d2} - x_{301a2}}\right)$$

where $\theta_1$ is the rotation angle, and ($x_{301a2}$, $y_{301a2}$) and ($x_{301d2}$, $y_{301d2}$) are the two vertex touched positions, and the rotation angle is comprises in the position transformation parameter.

11. The touch control method of claim 10 further comprising:
calculating the display area of the display unit according to the touched position set;
determining if the corresponding position is out of the display area; and
when the corresponding position is determined out of the display area, determining that the corresponding position is incorrect.

12. The touch control method of claim 10, wherein the touched position set for position setting comprises a vertex touched position, which is sensed when touching one of the four vertices of the display area, and the step (b) comprises:
when the hanged frame is parallel to the display area of the display unit, calculating an offset between the hanged frame and the display area of the display unit according to the vertex touched position, wherein the offset is taken as the position transformation parameter.

13. The touch control method of claim 12, wherein the offset is calculated by:

$$(\text{offset\_}x_1, \text{offset\_}y_1) = (\text{Origin\_}x_1 - x_{301a1}, \text{Origin\_}y_1 - y_{301a1})$$

wherein (offset_$x_1$, offset_$y_1$) is the offset, (Origin_$x_1$, Origin_$y_1$) is a position of one of the vertices of the hanged frame, and ($x_{301a1}$, $y_{301a1}$) is the vertex touched position.

14. The touch control method of claim 10, wherein the step (b) comprises:
   when aspect ratio of the display area and that of the frame are the same, calculating an offset between the hanged frame and the display area of the display unit according to the two vertex touched positions and the aspect ratio of the frame, wherein the offset is comprised in the position transformation parameter.

15. The touch control method of claim 10, wherein the touched position set for position setting comprises three vertex touched positions sensed when touching three of the four vertices of the display area, the step (b) comprises:
   calculating an offset between the hanged frame and the display area of the display unit according to the three vertex touched positions, wherein the offset is comprised in the position transformation parameter; and
   calculating a range of the display area of the display unit according to the three vertex touched positions.

16. The touch control method of claim 10, wherein the sensor is an optical sensing unit, a capacitive touch panel or an inductive touch panel.

* * * * *